US012173259B2

(12) United States Patent
Hunt

(10) Patent No.: US 12,173,259 B2
(45) Date of Patent: Dec. 24, 2024

(54) RUBBER CLEANING AND DEOXIDIZING COMPOSITION

(71) Applicant: Keith Brian Post Hunt, Woodstock, GA (US)

(72) Inventor: Keith Brian Post Hunt, Woodstock, GA (US)

( * ) Notice: Subject to any disclaimer, the term of this patent is extended or adjusted under 35 U.S.C. 154(b) by 499 days.

(21) Appl. No.: 17/557,792

(22) Filed: Dec. 21, 2021

(65) Prior Publication Data

US 2022/0195339 A1 Jun. 23, 2022

Related U.S. Application Data

(60) Provisional application No. 63/199,337, filed on Dec. 21, 2020.

(51) Int. Cl.
*C11D 3/20* (2006.01)
*C11D 3/04* (2006.01)
*C11D 3/43* (2006.01)
*C11D 3/50* (2006.01)

(52) U.S. Cl.
CPC ............ *C11D 3/042* (2013.01); *C11D 3/2065* (2013.01); *C11D 3/43* (2013.01); *C11D 2111/18* (2024.01)

(58) Field of Classification Search
CPC ..... C11D 3/042; C11D 3/2006; C11D 3/2065; C11D 3/2086; C11D 3/50
See application file for complete search history.

(56) References Cited

U.S. PATENT DOCUMENTS

| | | | | |
|---|---|---|---|---|
| 4,946,510 A | | 8/1990 | Kinnebrew, II et al. | |
| 6,367,488 B1 | * | 4/2002 | Murch | C11D 1/04 134/40 |
| 6,866,888 B2 | | 3/2005 | Baker et al. | |
| 7,971,308 B1 | | 7/2011 | Lawson | |
| 8,082,616 B2 | | 12/2011 | Tameno et al. | |
| 9,498,105 B2 | | 11/2016 | McLaughlin et al. | |
| 9,518,203 B2 | | 12/2016 | Weinreich et al. | |
| 10,125,339 B1 | | 11/2018 | Sauer et al. | |
| 2005/0065059 A1 | | 3/2005 | Roselle et al. | |
| 2007/0271715 A1 | | 11/2007 | Scoralle | |
| 2009/0313855 A1 | | 12/2009 | Skirrow | |
| 2012/0137449 A1 | | 6/2012 | Ransom et al. | |
| 2017/0065030 A1 | | 3/2017 | French et al. | |
| 2019/0144712 A1 | | 5/2019 | Li et al. | |
| 2020/0115604 A1 | | 4/2020 | Patrick | |
| 2020/0163532 A1 | | 5/2020 | George | |

FOREIGN PATENT DOCUMENTS

| | | | | |
|---|---|---|---|---|
| WO | WO 2020/198853 | * | 10/2020 | B01F 1/00 |
| WO | WO-2020198853 A1 | * | 10/2020 | A01N 25/04 |

* cited by examiner

*Primary Examiner* — Brian P Mruk
(74) *Attorney, Agent, or Firm* — Dunlap Bennett & Ludwig, PLLC; Anna L. Kinney

(57) ABSTRACT

A rubber cleaning composition includes water, a cleaning and oxidation removal agent, a conditioning agent, and a drying agent. The cleaning agent includes citric acid. The conditioning agent includes glycerin. The cleaning and oxidation removal agent is present in a water:cleaning and oxidation removal agent volume ratio of about 100:1 to about 300:1. The conditioning agent is present in a water: conditioning agent volume ratio of about 7:1 to about 8:1. The drying agent is present in a water:drying agent volume ratio of about 1:1 to about 2:1. The composition cleans, protects, and improves performance of rubber, such as climbing shoe rubber.

1 Claim, 2 Drawing Sheets

RUBBER CLEANING AND DEOXIDIZING COMPOSITION

CROSS-REFERENCE TO RELATED APPLICATION

This application claims the benefit of priority of U.S. provisional application No. 63/199,337, filed Dec. 21, 2020, the contents of which are herein incorporated by reference.

BACKGROUND OF THE INVENTION

The present invention relates to a cleaning composition and, more particularly, to a rubber cleaning composition.

Rock climbing shoe rubber gets dirty when used. Rock climbing shoes pick up dirt, chalk, and other debris while in use. Dirty shoes lead to degradation of climbing surfaces, both natural and manmade. Rubber on climbing shoes also becomes hard and slick as it oxidizes while exposed to oxygen. Both factors degrade the performance of the rubber, causing rock climbing shoes to have less friction with the climbing surface.

There is no commercially available product to clean and protect rock climbing shoe rubber or golf club grip rubber.

As can be seen, there is a need for a product that cleans rubber and protects it from oxidation.

SUMMARY OF THE INVENTION

The present invention provides a composition that cleans and de-oxidizes rubber. This composition generally comprises a combination of cleaning, drying, and conditioning agents to clean, protect, and improve performance of rubber, such as climbing shoe rubber. The composition may be a liquid provided in the form of a spray. The shoe spray cleans dirt, chalk, and debris from shoe rubber. It also de-oxidizes the shoe rubber, improving its tacky feel and improving the performance of the rubber for climbing. It also conditions the rubber to slow the oxidation process. The inventive composition may also be used to clean and de-oxidize rubber golf club grips, thereby improving the performance of the rubber grip.

In one aspect of the present invention, a rubber cleaning composition is provided, comprising water, a cleaning and oxidation removal agent including citric acid, a conditioning agent including glycerin, and a drying agent. The cleaning and oxidation removal agent is present in a water:cleaning and oxidation removal agent volume ratio of about 100:1 to about 300:1, the conditioning agent is present in a water: conditioning agent volume ratio of about 7:1 to about 8:1, and the drying agent is present in a water:drying agent volume ratio of about 1:1 to about 2:1.

These and other features, aspects and advantages of the present invention will become better understood with reference to the following drawings, description, and claims.

DETAILED DESCRIPTION OF THE INVENTION

Figure 1:
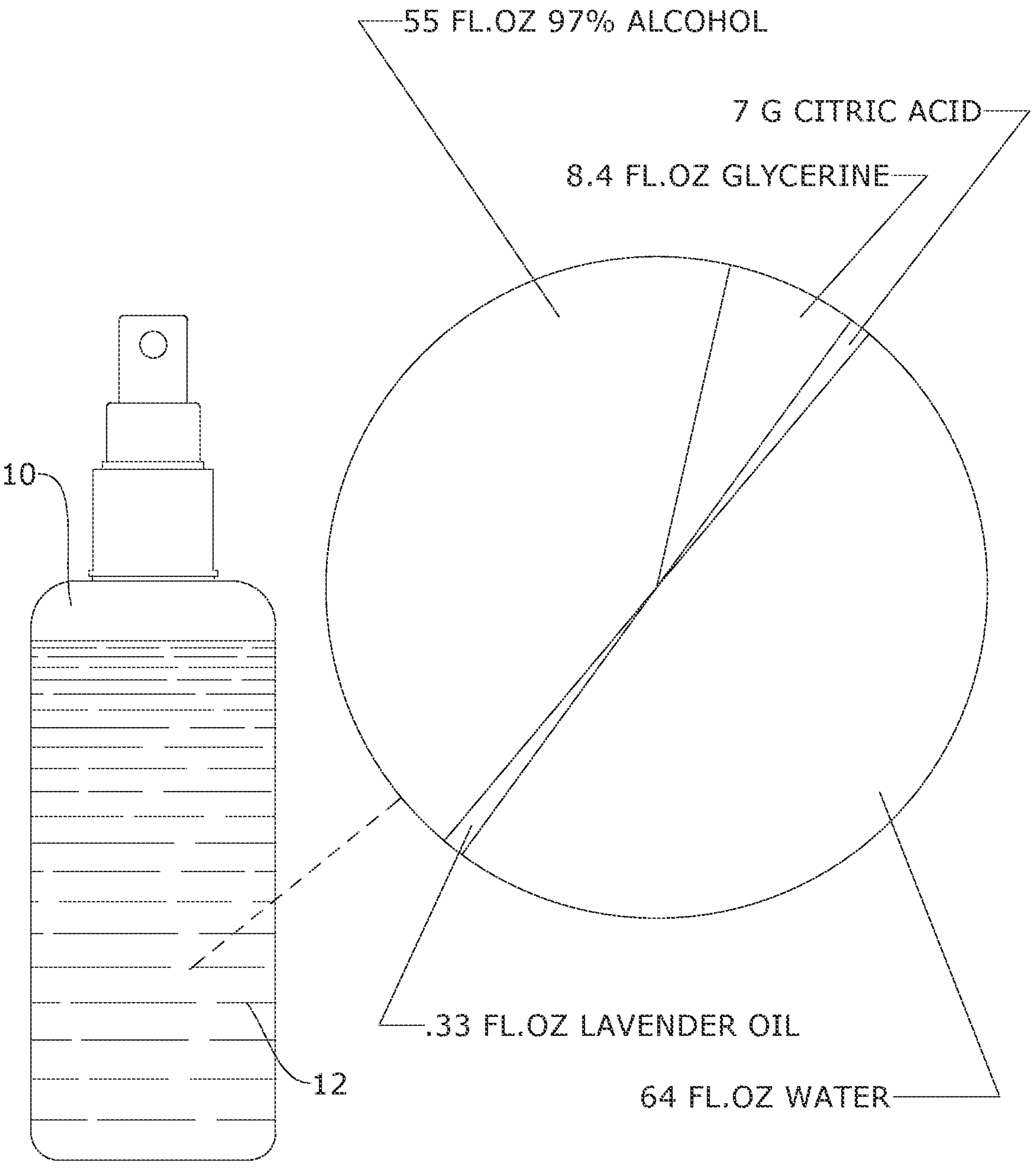
FIG. 1 is a schematic view of a spray bottle containing a composition according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Except where otherwise noted, percentages disclosed herein are percent by volume of the total composition.

Broadly, one embodiment of the present invention is a rubber cleaning and conditioning composition comprising a cleaning agent, an oxidation removal agent, a conditioning agent, and a drying agent.

In some embodiments, water serves as both the cleaning agent and the oxidation removal agent. Preferably, an additional cleaning agent is also provided. For example, citric acid may be provided as a cleaning agent. The combination of water and citric acid is operative to clean dirt and debris from the rubber.

In some embodiments, a conditioning agent may be used to slow the oxidation process of the rubber. For example, the conditioning agent may be glycerin. Alternatively, or additionally, another conditioning agent may be added.

In some embodiments, a drying agent may be used to speed the drying process. By increasing or decreasing the amount of drying agent, the drying time may be increased or decreased. For example, the drying agent may be isopropyl alcohol.

In some embodiments, a fragrance may be added. For example, the fragrance may be lavender oil.

In some embodiments, the composition may exclude one or more ingredients selected from the group consisting of ammonia, emulsifier, hydrocarbon-based solvent, surfactant, and any combination thereof.

In some embodiments, the composition may include a non-water fraction comprising about 80 to about 85% by volume drying agent; about 14% by volume conditioning agent; and about 0.5% by volume cleaning agent.

The components may be present at amounts within a range of values. For example, the water:isopropyl alcohol volume ratio may be about 1:1 to about 2:1. The water: glycerin volume ratio may be about 7:1 to about 8:1. The isopropyl alcohol:glycerin volume ratio may be about 5:1 to about 6:1. The water to citric acid volume ratio may be from about 100:1 to about 300:1. When lavender oil is present, the water to lavender oil volume ratio may be from about 100:1 to about 300:1.

Preferred ratios of the ingredients offer the maximum benefit from the composition.

An exemplary solution comprises:

50% water
42.5% Isopropyl Alcohol 97%
7% Glycerin
0.25% Lavender Oil
0.25% Citric Acid The inventive composition may be manufactured by mixing the ingredients together in predetermined amounts.

The inventive composition may be used according to the following method. The cleaning solution may be sprayed on the rubber of rock-climbing shoes or golf grips by the user. The solution may be allowed to sit on the rubber for a predetermined time to begin to clean and de-oxidize the rubber. Then the user may wipe the shoe rubber or golf grip with a cloth to remove the dirt, chalk, debris, and excess solution. The clean and de-oxidized rubber generally exhibits improved friction and contact with a climbing surface, reduces slipperiness, and improves the feel of golf club grips.

Figure 2:
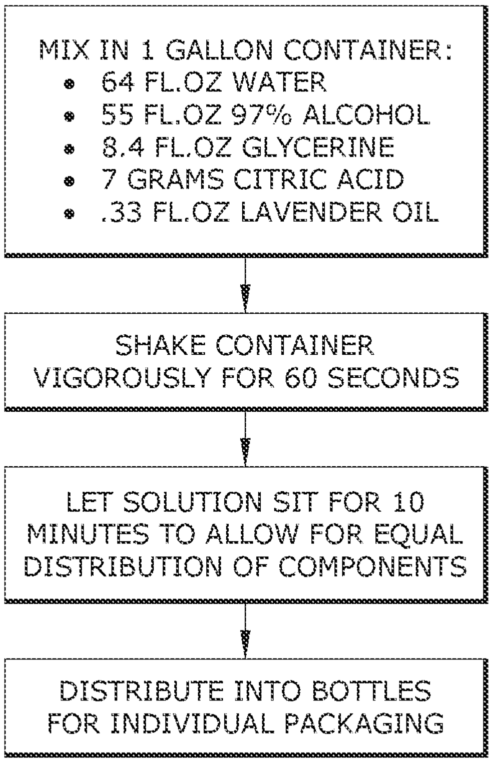
FIG. 2 is a flowchart of a method of manufacturing the composition of FIG. 1 according to an embodiment of the present invention.

Referring to FIGS. 1 and 2, FIG. 1 illustrates a bottle 10 containing a formula 12 comprising amounts of various ingredients in a composition according to an embodiment of the present invention. FIG. 2 illustrates a method of manufacturing the composition. A manufacturer may add, for example, about 64 oz. of water, about 55 oz. of Isopropyl or Ethyl Alcohol, about 8.4 oz. of Glycerine, about 7 grams of Citric Acid, and about 0.5 oz. Lavender Oil to a one-gallon container and mix the solution vigorously. The solution may be left to sit for about 1 hour to allow for equal distribution and then distributed into individual bottles.

It should be understood, of course, that the foregoing relates to exemplary embodiments of the invention and that modifications may be made without departing from the spirit and scope of the invention as set forth in the following claims.

What is claimed is:

1. A rubber cleaning composition, consisting of:

water;

citric acid;

glycerin;

a drying agent selected from the group consisting of isopropyl alcohol and ethyl alcohol; and lavender oil;

wherein the citric acid is present in a water: citric acid volume ratio of about 100:1 to about 300:1, the glycerin is present in a water: glycerin volume ratio of about 7:1 to about 8:1, the drying agent is present in a water: drying agent volume ratio of about 1:1 to about 2:1, and the lavender oil is present in a water:lavender oil volume ratio of about 100:1 to about 300:1.

* * * * *